(No Model.)

C. H. DOUGLAS.
CHAIN CUTTER FOR MORTISING MACHINES.

No. 363,123. Patented May 17, 1887.

WITNESSES:
Leonard Allen
A. F. Smith

INVENTOR
Charles H. Douglas

UNITED STATES PATENT OFFICE.

CHARLES H. DOUGLAS, OF CHICAGO, ILLINOIS, ASSIGNOR TO THE CHICAGO MORTISING MACHINE COMPANY, OF SAME PLACE.

CHAIN CUTTER FOR MORTISING-MACHINES.

SPECIFICATION forming part of Letters Patent No. 363,123, dated May 17, 1887.

Application filed March 26, 1884. Serial No. 125,645. (No model.)

*To all whom it may concern:*

Be it known that I, CHARLES H. DOUGLAS, a citizen of the United States, residing at Chicago, in the county of Cook and State of Illinois, have invented new and useful Improvements in Chain Cutters for Mortising-Machines, of which the following is a specification.

My invention relates to improvements in mortising-machines in which an endless chain of teeth or cutters is driven around a flat tension-bar to make mortises in lumber; and the objects of my improvements are, first, to provide a chain to run around a tension-bar that will make an accurate mortise through any lumber used for that purpose; second, to so construct it that the cutting-edges thereon may be kept sharp without perceptibly reducing the length or width of the mortise thereby; third, to give it an easier and freer cut, so that less power will be required to do the same amount of work. I attain these objects by the mechanism illustrated in the accompanying drawings, in which—

Figure 1:
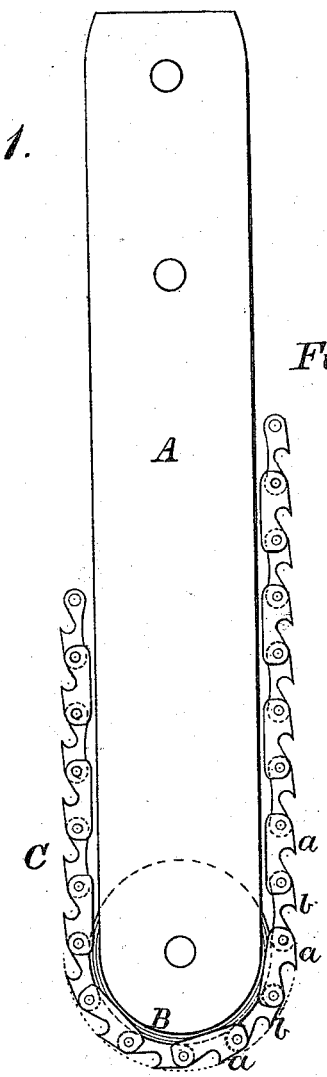
Figure 2:
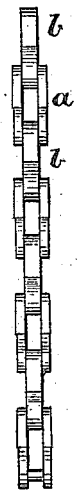
Figures 3, 4:
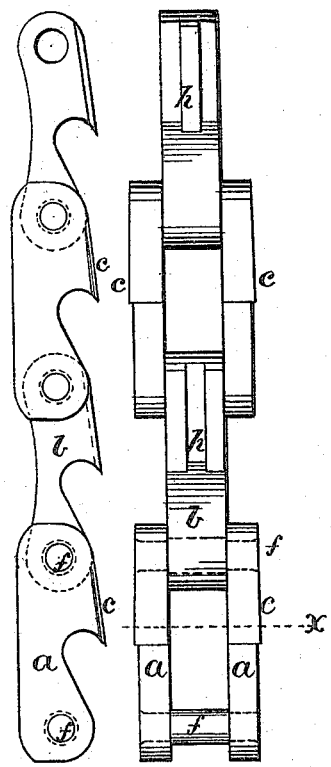
Figure 5:
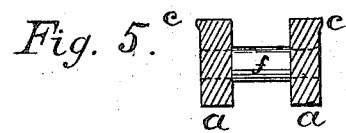

Figure 1 is a front elevation of the tension-bar and lower portion of the chain of a mortising-machine. Fig. 2 is a view of the cutting-edge of a portion of the chain. Figs. 3 and 4 are enlarged side and edge views of a few links of the chain, and Fig. 5 is a transverse section of one of the links of the chain cut through on the dotted line at *x*.

A is the tension-bar, in the bottom end of which there is a pulley, B.

C is a portion of an endless chain of cutters, which is driven by a sprocket-wheel above the bar A, (the sprocket-wheel and the upper portion of the chain not being shown in the drawings,) and runs upon the pulley B in passing around the bottom of the bar. The chain C consists of a series of sharp chisel-edged cutters, and are of two depths, two of the deeper cutters, *a a*, forming one link, and one or more of the shallower cutters, *b b*, riveted between them loosely, forming the next link. The rivets *f f* are firmly riveted or attached to the outside cutters, *a a*, but pass loosely through the ends of cutters *b b*, thus forming a firm but flexible joint. The cutters *b b* are curved in on the back to fit the curve of the pulley B, upon which they are made to run, and the cutters *a a* are made deeper and run upon the outsides of the pulley, for the purpose of holding the chain firmly thereon and preventing any lateral play of the chain while cutting, as shown in Fig. 1.

The chain C consists of a series of alternate double and single links, each member of each link forming a tooth, said tooth being provided with a cutting-edge at its outer forward extremity, and having a throat or gullet beneath said cutting-edge. The outer surface or back of each tooth from the cutting-edge back to the joint is inclined inward at an angle to the line of cut, as shown by the dotted line at the bottom of Fig. 1, for the purpose of giving the exact form and clearance required for the most perfect chisel cut.

On the side of cutter *a* from the cutting-edge back toward the joint there is a slight projection or rib, *c c*, Figs. 3, 4, and 5, for the purpose of making the necessary clearance to prevent the chain from binding in the mortise.

Each rib *c* is provided with a plane surface of some width, extending from the upper edge of the tooth downward some little distance, as shown more particularly in Figs. 3 and 5 of the drawings, this plane surface being formed on the side of the rib, and being located farther from the central line of the chain than the side proper of the cutter. The plane surfaces of these ribs bear against the side of the cut formed in the material operated upon with a somewhat extended bearing, so far as the width or height of the tooth is concerned, and effectually prevent the tendency common in other forms of chain-saw teeth to follow the grain of the wood, and thus cause the cutter to deviate laterally, thereby destroying the uniformity of the cut or mortise. Clearance has heretofore been provided in endless-chain cutters either by offsetting the teeth when they are in the nature of ordinary saw-teeth or, when a chisel-shaped cutter is employed, by hollow grinding or beveling the sides of the cutters, thus forming at the upper edge a sharp corner or ridge and at the junction of this sharp ridge and the cutting-edge an exceedingly sharp corner, which tends to cat into the wood and follow the course of the grain thereon, thus materially affecting the accuracy of the cut. With my improved plane-faced rib having an extended bearing without a sharp ridge and projecting corner this tendency is effectually overcome. Moreover, in the old form of cutter referred to, the sharp ridge and projecting corner rapidly wear down, and must be renewed by filing or grinding upon the sides of the cutters, thus diminishing their width at each renewal. With my improved cutter the only grinding necessary is in the throat of the cutter under the cutting-edge, the side rib not wearing away, and thereby obviating the necessity of side grinding or filing. The cutters can thus be readily reground without changing the diameter or width of the cut or altering the uniformity or accuracy of the cutters.

The links formed of the cutters $a\ a$ determine the width of the mortise, and to make them accurate and uniform in the entire chain the rivets $f\ f$ are reduced on their ends, leaving shoulders the required distance apart to rivet the cutters $a\ a$ firmly against. The cutters $b\ b$ are the proper width to fill the space between the cutters $a\ a$ and revolve freely upon the centers of rivets $f\ f$.

Cutters that are too wide on the face to make an easy cut may be divided by alternate grooves and tongues thereon the depth of the chip $h\ h$, Fig. 4.

The chain may be interspersed with links on which there are no cutting-edges, if desirable; also, the ribs $c\ c$ may not be required on all the cutters $a\ a$ to produce the desired result.

The chains that have been used for mortising prior to my invention consist of thin links on which there are triangular teeth, like the usual saw-tooth. These cannot be sharpened without materially reducing the diameter of the cut and also changing or destroying the set. They work hard, are not durable, and while mortising are liable to run out of true in the timber. These defects are fully overcome by substituting my chisel-shaped cutters for the saw-teeth and the rib $c$ for the usual set; also by making the outside cutters, $a\ a$, rigid in relation to each other and deep enough to run astride the rim or face of pulley B, for the purpose of preventing any lateral play of the chain while cutting or tendency to run out of true. This form of cutters in a chain also requires much less power to make a mortise, and consequently the strain and wear upon the rivets are materially lessened.

I claim—

An endless-chain cutter for mortising-machines, consisting of a series of alternate double and single links, each member of each link forming a tooth provided with a cutting-edge at its outer forward extremity, a throat or gullet beneath said cutting-edge, and an inwardly-inclined back or outer surface, the teeth of the double links being provided with lateral ribs $c$ upon their external sides at the junction of the sides and backs, said ribs projecting beyond the sides of the teeth, having plane surface of some width from the backs inward and extending from the cutting-edge to the rear of the teeth, substantially as and for the purposes specified.

CHARLES H. DOUGLAS.

Witnesses:
 LUMAN ALLEN,
 A. F. SMITH.